(12) United States Patent
Schjerven, Sr. et al.

(10) Patent No.: US 10,123,543 B2
(45) Date of Patent: Nov. 13, 2018

(54) BYPASS CIRCUIT AND WIPE TECHNIQUE FOR CONTACTOR USED TO OPERATE SOLID STATE RELAYS THAT CONTROL HEATING ELEMENTS

(71) Applicant: THE MIDDLEBY CORPORATION, Elgin, IL (US)

(72) Inventors: William S. Schjerven, Sr., Schaumburg, IL (US); James Jeffery Hanson, Elgin, IL (US); Ricky Joe Sullivan McIntosh, Altoona, IA (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 940 days.

(21) Appl. No.: 14/379,052

(22) PCT Filed: Mar. 13, 2013

(86) PCT No.: PCT/US2013/030680
§ 371 (c)(1),
(2) Date: Aug. 15, 2014

(87) PCT Pub. No.: WO2013/138410
PCT Pub. Date: Sep. 19, 2013

(65) Prior Publication Data
US 2015/0245623 A1 Sep. 3, 2015

Related U.S. Application Data

(60) Provisional application No. 61/610,939, filed on Mar. 14, 2012.

(51) Int. Cl.
*A21B 1/00* (2006.01)
*A21B 1/40* (2006.01)
(Continued)

(52) U.S. Cl.
CPC .............. *A21B 1/40* (2013.01); *H02H 3/05* (2013.01); *H02H 5/04* (2013.01)

(58) Field of Classification Search
CPC ........... A21B 1/40; B62B 7/142; B62B 7/145; H02H 3/05; H02H 5/04
(Continued)

(56) References Cited

U.S. PATENT DOCUMENTS 4,572,772 A    2/1986  Peterson
5,109,146 A *  4/1992  Maenishi ............... H01H 9/443
                                                  218/26

(Continued)

FOREIGN PATENT DOCUMENTS

FR    2134069 A1   12/1972
GB    2131619 A     6/1984

OTHER PUBLICATIONS

Fujitsu Components International "Engineering Reference Relays" Copyright 2009 (31 pages).

(Continued)

*Primary Examiner* — Dana Ross
*Assistant Examiner* — Joseph Iskra
(74) *Attorney, Agent, or Firm* — Michael Best & Friedrich LLP

(57) ABSTRACT

A control circuit for a cooking oven. The control circuit includes a contactor. The contactor has at least one contact and at least one coil. A relay (such as a solid-state relay) is in series connection with the contactor. A heating element is controlled by the relay and is in series connection with the relay and the contactor. The controller also includes a controller. The controller is configured to bypass the relay and to control power to the at least one coil.

22 Claims, 8 Drawing Sheets

(51) Int. Cl.
*H02H 3/05* (2006.01)
*H02H 5/04* (2006.01)

(58) Field of Classification Search
USPC ............... 219/414, 262, 412, 419, 425, 441
See application file for complete search history.

(56) References Cited

U.S. PATENT DOCUMENTS

| | | | |
|---|---|---|---|
| 5,179,290 | A | 1/1993 | Page |
| 5,197,375 | A * | 3/1993 | Rosenbrock ............ A21B 1/40 |
| | | | 219/388 |
| 5,496,459 | A | 3/1996 | Esterlis |
| 5,858,479 | A | 1/1999 | Saito et al. |
| 5,938,949 | A | 8/1999 | Enyedy et al. |
| 7,385,791 | B2 | 6/2008 | Ness |
| 2004/0081732 | A1 | 4/2004 | Weiss |
| 2008/0037965 | A1 | 2/2008 | De Luca |
| 2009/0236329 | A1 * | 9/2009 | Sato ................... B60H 1/00392 |
| | | | 219/660 |

OTHER PUBLICATIONS

Tyco Electronics Corporation—P&B "Relay Contact Life" Dec. 2000 (3 pages).
International Search Report and Written Opinion of the International Searching Authority, International Patent Application No. PCT/US2013/030680, dated May 23, 2013 (12 pages).

\* cited by examiner

BYPASS CIRCUIT AND WIPE TECHNIQUE FOR CONTACTOR USED TO OPERATE SOLID STATE RELAYS THAT CONTROL HEATING ELEMENTS

BACKGROUND

The present invention relates to heating circuits and, more particularly, to heating circuits in conveyor ovens.

Electric heating elements are used in infrared cooking ovens, including infrared conveyor ovens used to cook pizzas and other foods. Electric heating elements can be controlled by solid-state, zero-cross relays. In particular, the supply of electrical power to the heating elements is controlled by the relays. Electrical noise is generated when relay contacts open and close and zero-cross relays generate less noise than other types of relays. As with most components, solid-state relays are subject to failure and if a relay fails in the on position, a constant supply of power is provided to the heating element. This could lead to over-heating and other hazards. A coil-activated or triggered contactor can be used in the circuit prior to (or in series with) the solid-state relays to provide a safety (or circuit break) in case a solid-state relay fails in the on position. A high-temperature-limit-control switch operates the contactor coil and, if the high limit is tripped, the coil to the contactor is de-energized and the contactor opens. When the contactor opens, the supply of power to the heating element is interrupted.

SUMMARY

Recently, the materials used in contactors have changed. In particular, the metal used for contacts in contactors has been changed to silver. Silver replaced other metal for environmental reasons. It is believed that silver contactors oxidize during normal use of the conveyor oven. Once a contactor is contaminated, such as by oxidation, the contamination creates a resistance high enough to prevent power from flowing through the contactor; even if the contacts of the contactors are in a closed position. Thus, the electric heating elements do not receive power, and cannot cook food.

In one embodiment, the invention provides a control circuit for a cooking oven. The control circuit includes a contactor that has at least one contact and at least one coil; a solid-state relay in series connection with the contactor; and a heating element controlled by the solid-state relay. The heating element is in series connection with the solid-state relay and the contactor. The controller is configured to bypass the solid-state relay, and control power to the at least one coil.

In another embodiment, the invention provides a method for controlling a cooking oven, the cooking oven including a housing and a heating element. The method comprising placing in a series-type configuration, a relay, a contactor including at least one contact and at least one coil, and the heating element. The method further comprising controlling a bypass of the relay; and controlling power to the at least one coil; wherein the heating element is controlled by the relay.

In another embodiment, the invention provides a method of controlling a cooking oven having at least one heating element and at least one contactor, the at least one contactor having an associated coil. The method comprising receiving, at a controller, a signal from a user power switch; generating, with the controller, a signal to activate one or more first relays; shorting one or more second relays subsequent to activating the one or more first relays; connecting the at least one contactor directly in series with the at least one heating element; energizing the coil of the at least one contactor; and de-activating the one or more first relays.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
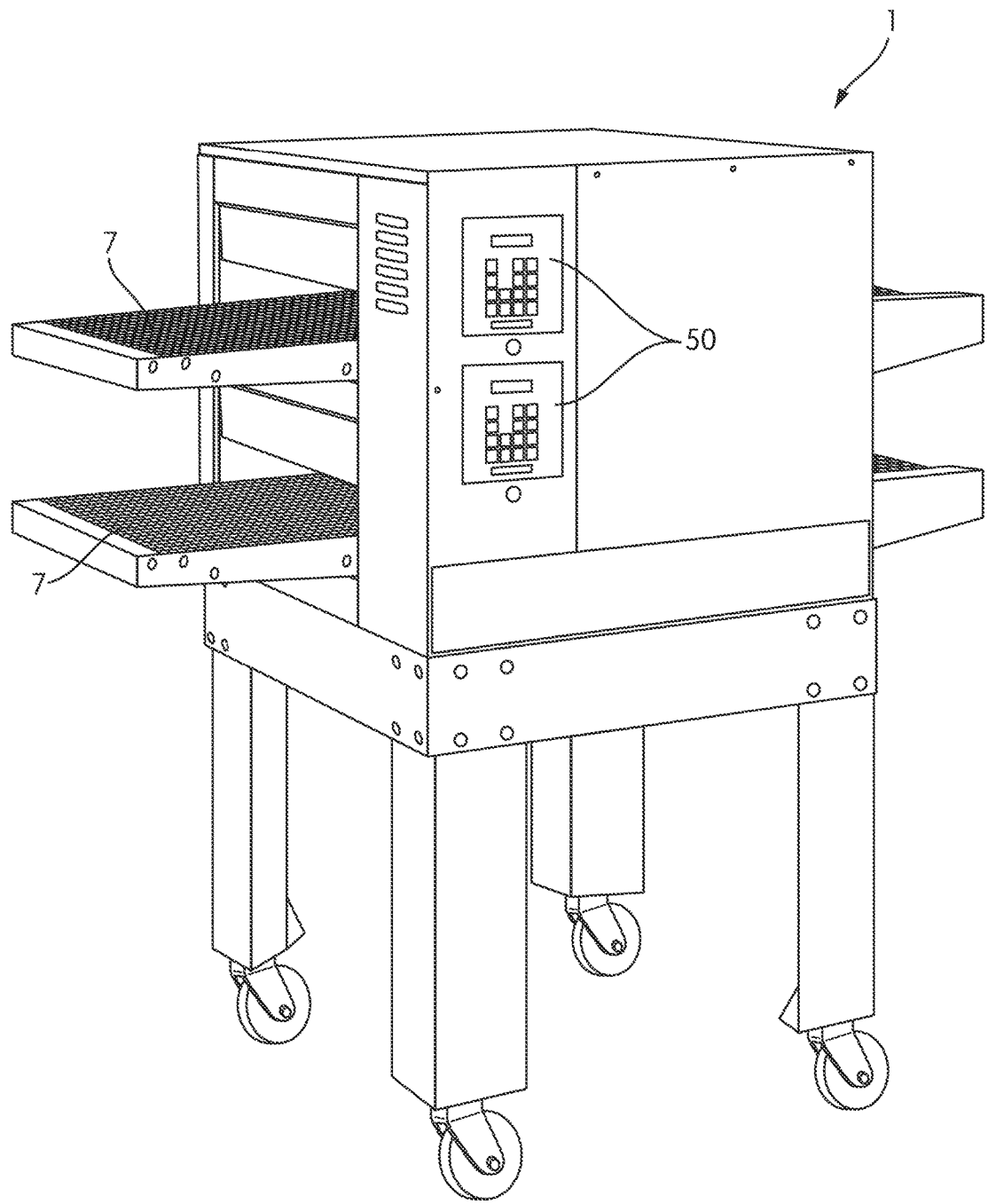
FIG. 1 is a perspective view of an infrared conveyor oven.

FIG. 1 is a perspective view of an infrared conveyor oven 1. The conveyor oven 1 includes a housing 5 and conveyor 7. The housing 5 encloses the electrical components 10 (shown in FIGS. 2 and 5) of the conveyor oven 1. The conveyor 7 is made of a metal woven wire mesh and is used to transport food through the conveyor oven 1. The conveyor 7 is coupled to a motor 11 (shown in FIGS. 2 and 5), which moves the conveyor 7 through the conveyor oven 1.

Figure 2:
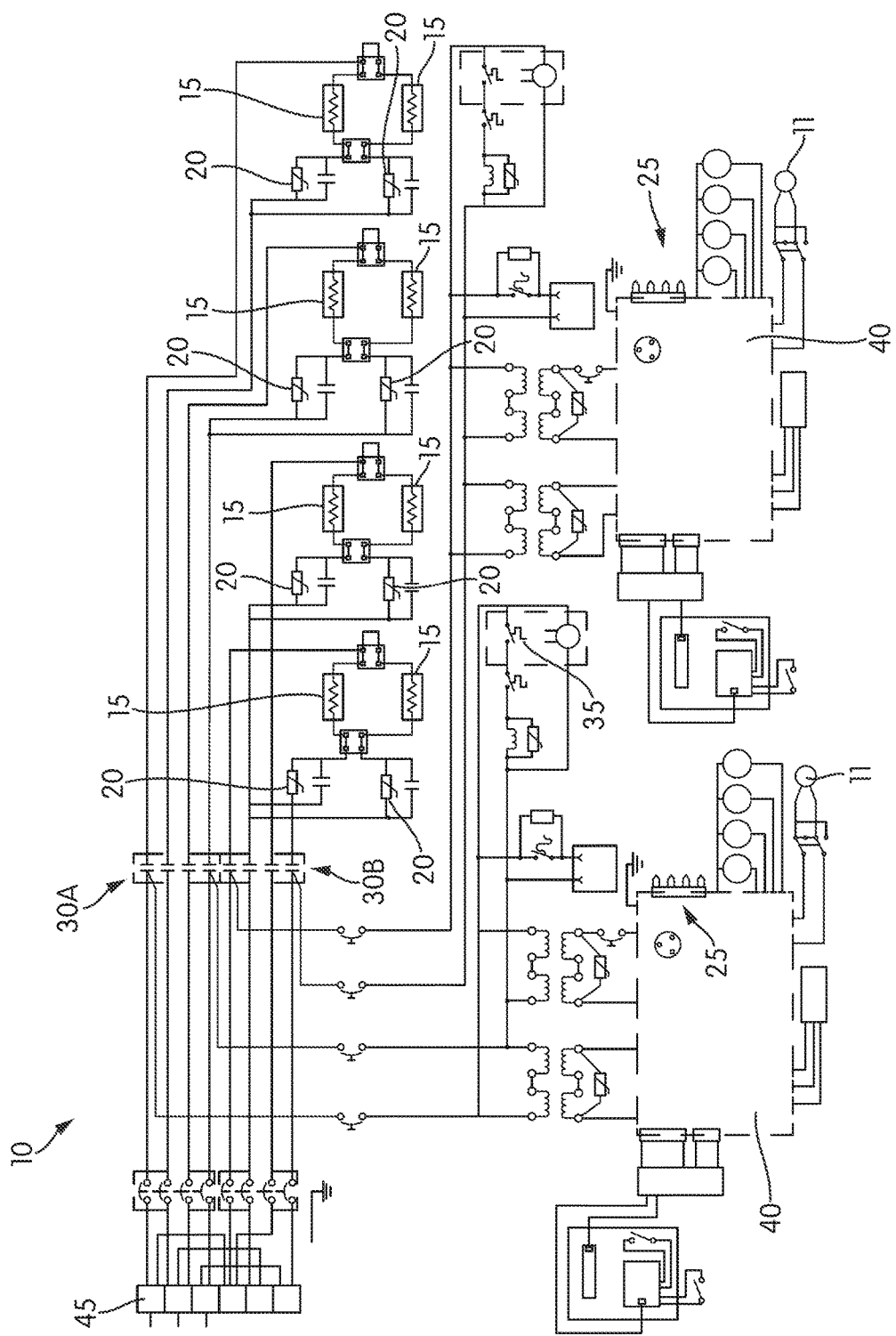
FIG. 2 is a circuit diagram of an infrared conveyor oven having a plurality of heating elements, solid-state control relays, and two contactors.

FIG. 2 is a circuit diagram illustrating the electrical components 10 of the conveyor oven 1. The conveyor oven 1 generally includes heating elements 15, solid-state control relays 20, temperature sensors 25, contactors 30A and 30B, a temperature switch 35, and a controller 40. In the embodiment shown, a power supply 45 provides 230V AC voltage to the electrical components 10. It is possible that the conveyor oven 1 and electrical components 10 could be designed to operate using a different power supply voltage (and current). The heating elements 15, solid-state control relays 20, and contactors 30A and 30B are connected in a series-type configuration. In the embodiment shown, there are two controllers 40, one controlling the upper set of heating elements, and one controlling the lower set of heating elements. In the embodiment illustrated, the controllers are substantially identical.

The phrase "series-type configuration" as used herein refers to a circuit arrangement where the described elements are arranged, in general, in a sequential fashion such that the output of one element is coupled to the input of another, but the same current may not pass through each element. For example, in a "series-type configuration," it is possible for additional circuit elements to be connected in parallel with one or more of the elements in the "series-type configuration." Furthermore, additional circuit elements can be connected at nodes in the series-type configuration such that branches in the circuit are present. Therefore, elements in a series-type configuration do not necessarily form a true "series circuit."

The heating elements 15 are electrical loads that produce infrared light to produce heat. The heating elements 15 receive power from the power supply 45 and, in the embodiment illustrated, produce long-wave, infrared light to cook food.

The solid-state control relays 20 control the supplied power to the heating elements 15 (and, thus, can be considered power control relays). The solid-state control relays 20 are electronic switching devices that switch the power to the heating elements 15 on or off. In some embodiments, the solid-state control relays 20 do not contain moving parts, thus minimizing any electrical noise when switching the supplied power on or off. In other embodiments, the solid-state relays 20 contain moving parts.

The contactors 30A and 30B further control the supplied power to the heating elements 15. The contactors 30A and 30B act as a safety, in case a solid-state control relay 20 fails. The contactors 30A and 30B are electronic switching devices that control the power to the heating elements 15, through the solid-state control relays 20. The contactors 30A and 30B include contacts and coils. When the coil is energized or powered, the contacts close together, allowing current to flow to the heating elements. If the coil is de-energized, the contacts are open, and current is not supplied to the heating elements 15.

The temperature switch 35 senses the temperature of the oven and controls the power to the coils. The temperature switch 35 provides power to the coils if the sensed temperature of the oven is under a safety shutoff temperature (approximately 975° Fahrenheit). If the safety shutoff temperature is met, the temperature switch 35 disconnects the power to the coils of the contactors 30A and 30B opening the contacts, thereby cutting off power to the solid-state relays 20 and heating elements 15.

Figure 3:
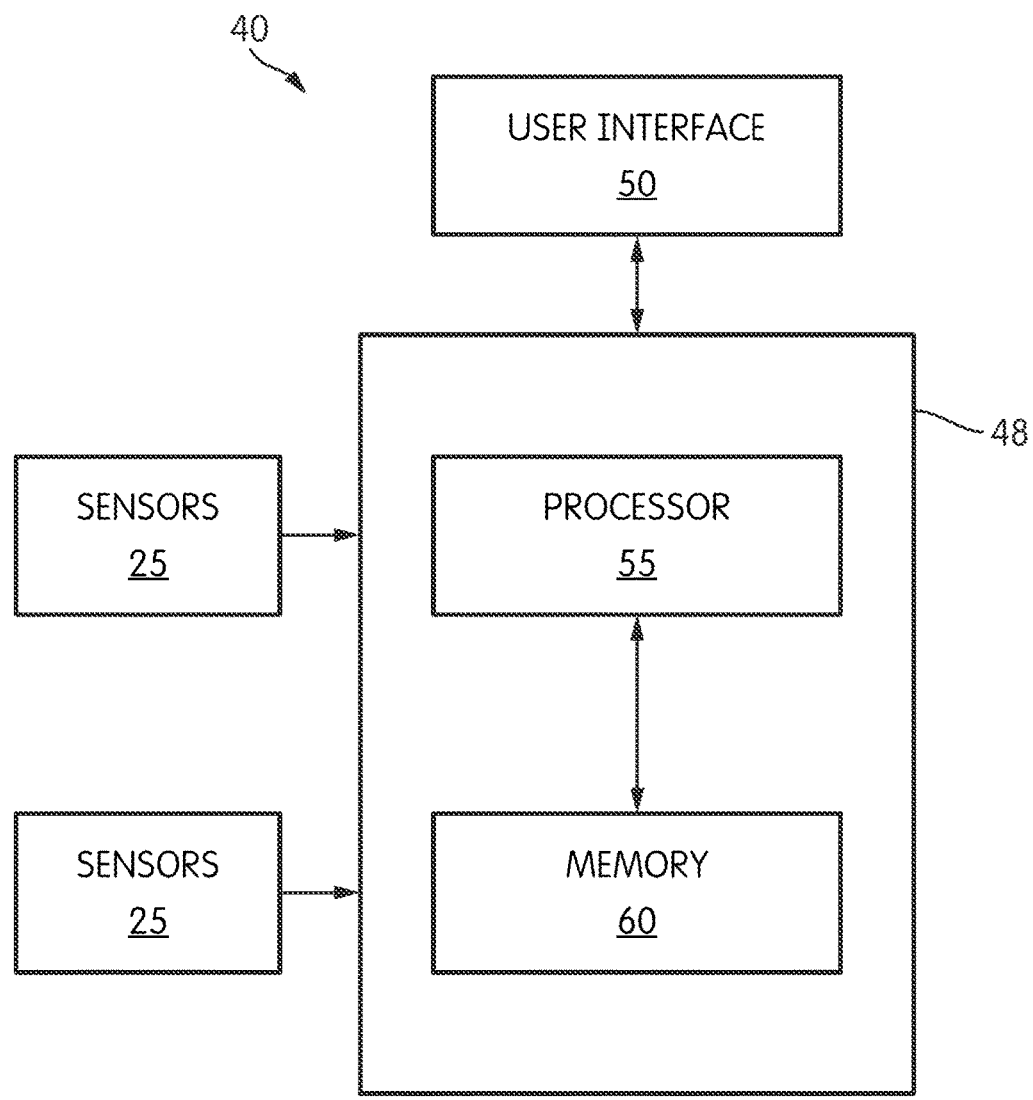
FIG. 3 is a block diagram of a controller of an infrared oven.

FIG. 3 is a block diagram illustrating one of the controllers 40. Each controller 40 includes a microcontroller 48 and a user interface 50. The microcontroller 48 includes a processor 55 and memory 60. The processor 55 receives inputs from the user interface 50 and temperature sensors 25. The processor 55 then executes software stored in the memory 60. The processor 55 (using the software) analyzes the received inputs and generates one or more control signals that control the solid-state relays 20 and motor 11.

At least one controller 40 controls the speed of the motor 11, and thus the speed of the conveyor 7. The controller 40 receives a user set cook time input from the user interface 60 and controls the speed of the motor 11 based on the set cook time.

Each controller 40 further controls the temperature of the conveyor oven 1. The temperature is based on a user set temperature entered into the user interface 50. The controller 40 controls the temperature by turning the solid-state relays 40 on or off which, in turn, controls power (on or off) being supplied to the heating elements 15. The controller 40 controls the solid-state relays 40 depending on the current temperature sensed by the temperature sensors 25 as compared to the user set temperature.

Figure 4:
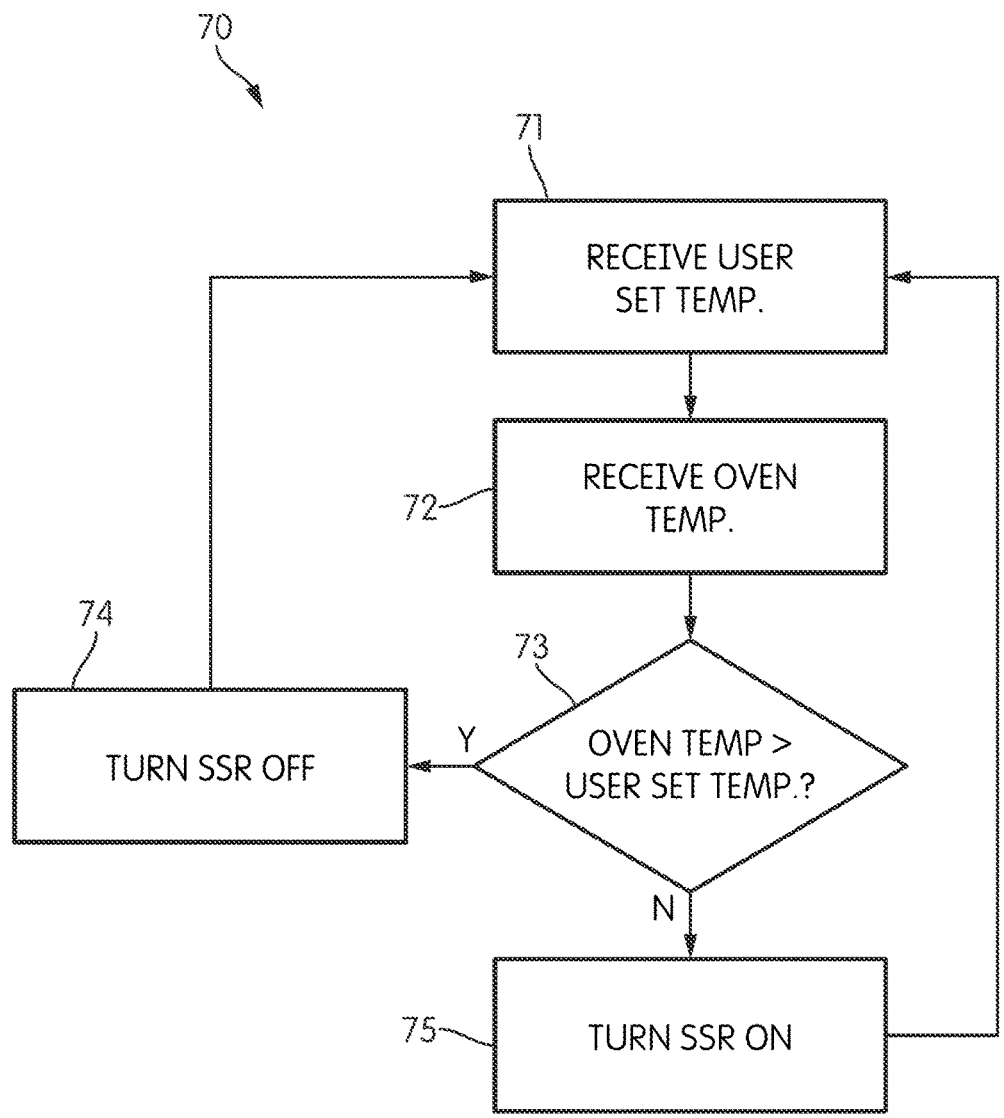
FIG. 4 is a flow diagram of a process for controlling the temperature of an infrared oven.

FIG. 4 is a process 70 for controlling the temperature of the conveyor oven 1, or more specifically, one set of the heating elements 15 (either upper or lower). The process 70 is performed when the controller 40 receives a user set temperature from the user interface 50 (Step 71). The controller 40 then receives the temperature of the conveyor oven 1 from the temperature sensors 25 (Step 72). The controller 45 then determines if the temperature of the conveyor oven 1 is above the user set temperature (Step 73). If the temperature of the conveyor oven 1 is above the user set temperature, the controller 40 turns the solid-state relays 20 off, thus cutting off power to the heating elements 15 (Step 74). If the temperature of the conveyor oven 1 is not above the user set temperature, the controller 40 turns the solid-state relays 20 on, thus providing power to the heating elements 15 (Step 75). The controller 40 then cycles back to Step 71.

Figure 5:
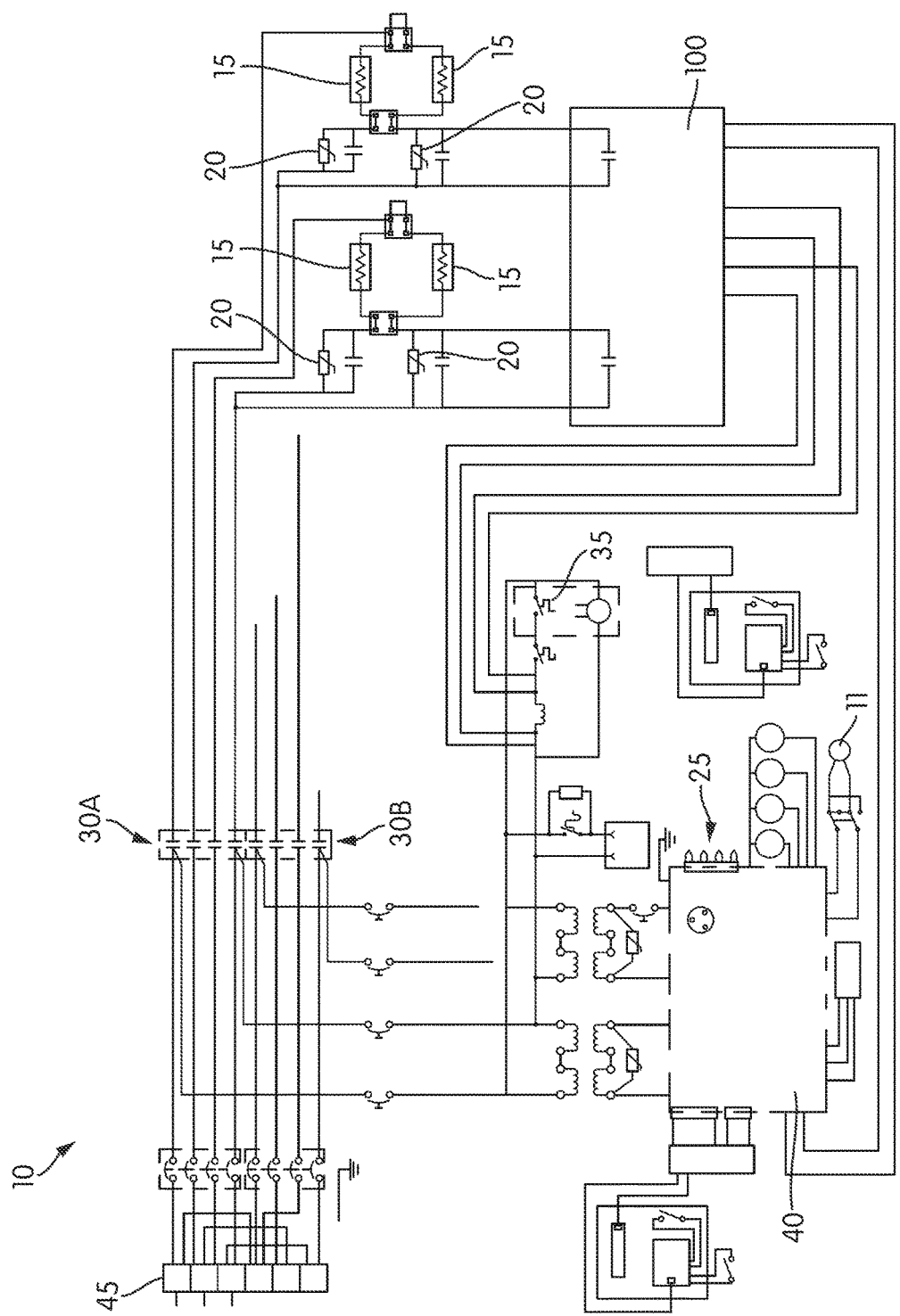
FIG. 5 is a circuit diagram of an infrared conveyor oven having a plurality of heating elements, two contactors, and a high-amp bypass circuit.

FIG. 5 is a circuit diagram illustrating the electrical components 10 of a conveyor oven 1 with a bypass controller 100. The bypass controller 100 is a controller used at startup of the conveyor oven 1 to create a burning arc across the contacts of the contactors 30A and 30B. The arc burns away oxidation on the contacts of the contactors 30A and 30B. Burning away contamination, such as oxidation, is sometime referred to as "wiping" the contacts or "cleaning" the contacts.

Figure 6:
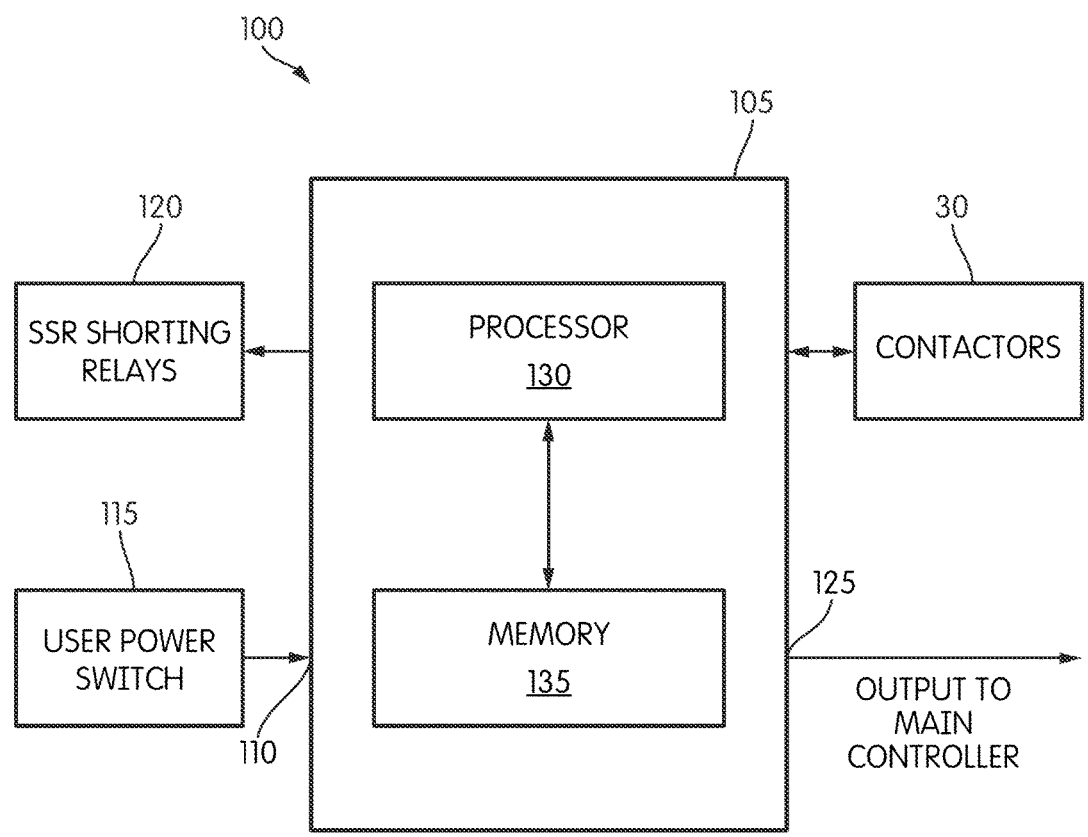
FIG. 6 is a block diagram of the high-amp bypass circuit.

FIG. 6 is a block diagram illustrating the bypass controller 100 of the conveyor oven 1. The bypass controller 100 includes a microcontroller 105. The controller 100 has an input 110 which is connected to a user power switch 115. The controller 100 is also connected to solid-state shorting relays 120, and provides commands and similar signal on an output 125 connected to the controller 40. In one embodiment, the microcontroller is a Microchip model number PIC12F508 integrated circuit. The microcontroller 105 generally includes a processor 130 and a memory 135. The processor 130 receives various inputs and executes a software program, stored in the memory 135, for analyzing the received inputs, and generates one or more control signals, or outputs. The user power switch 115 is the main power switch of the conveyor oven 1 and is located on the user interface 50. The bypass controller 100 receives a signal from the user power switch 115 (through input 110) when the conveyor oven 1 is turned on or off. The bypass controller 100 is electrically coupled to the coils of the contactors 30A and 30B.

The solid-state shorting relays 120, when activated, short out the solid-state relays 20. In other words, when the shorting relays 120 are turned on, a circuit path is created that bypasses the relays 20. Thus, the controller 100 can be considered or viewed as bypassing or shorting the relays 20. As discussed in greater detail below, shorting the relays is a first step in a process where contactors 30A and 30B are "wiped" or cleaned. Upon completion of the "wipe" process, the bypass controller 100 sends a signal to the controller 40 through output 125 to continue operation of the oven, as is further discussed below.

At startup or shutdown the bypass controller 100 receives a signal from the user power switch 115 at input 110. Upon receiving either signal, the bypass controller 100 activates the solid-state shorting relays 120. Activation of the shorting relays 120, shorts out the solid-state relays 20. Once the solid-state relays 20 are shorted out, the contactors 30A and 30B are connected directly in series with the heating elements 15. The bypass controller 100 then energizes the coils of the contactors 30A and 30B. Once the coils are energized, the contacts of the contactors 30A and 30B close. The heating elements 15 then draw a relatively large current (approximately ten amps) through the contacts of the contactors 30A and 30B. The ten amps of current create a burning arc across the contacts. The arc "wipes" the contacts clean (or removes or reduces the contamination, such as oxidation). The bypass controller 100 then de-activates the solid-state shorting relays 120, releasing the short across the solid-state relays 20. The bypass controller 100 then sends a signal to the controller 40 through the output 125. In the case of startup, the controller 40 receives the signal and begins normal operation of the conveyor oven 1. In the case of shutdown, the controller 40 receives the signal and powers down the conveyor oven 1. In another embodiment the bypass controller 100 performs the "wiping" process upon user activation or other preprogrammed events. In such an embodiment, the conveyor oven 1 further includes a user bypass switch. Upon activation by a user, the user bypass switch sends a signal to the bypass controller 100. Upon receiving the signal, the bypass controller 100 performs the "wiping" process.

Figure 7:
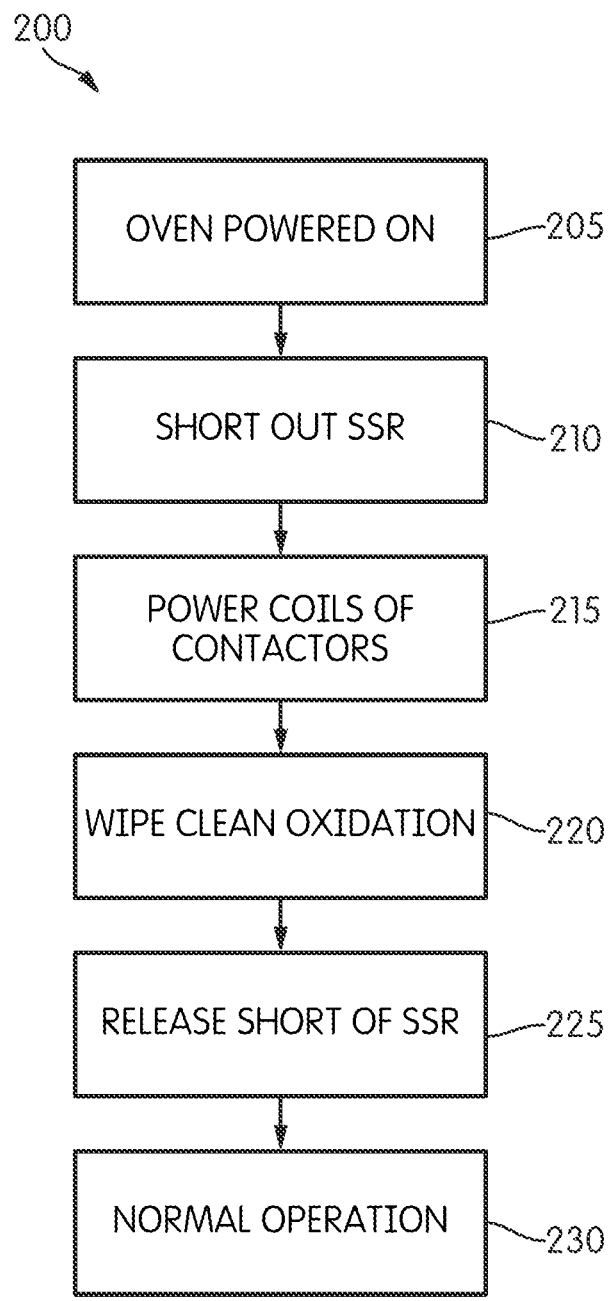
FIG. 7 is a flow diagram of a process for controlling power to a plurality of heating elements.

FIG. 7 illustrates a process 200 for controlling the power to the heating elements 15 upon startup. The process 200 is performed when the conveyor oven 1 is powered on (Step 205). Once the conveyor oven 1 is powered on and the bypass controller 100 receives the signal, the bypass controller 100 activates the solid-state shorting relays 120 to short out the solid-state relays 20 (Step 210). The bypass controller 100 then powers the coils of the contactors 30A and 30B, thus closing the contacts of the contactors 30A and 30B (Step 215). The heating elements 15 draw approximately ten amps of current through the contacts of the contactors 30A and 30B, creating a burning arc across the contacts (Step 220). The bypass controller 100 then releases the short across the solid-state relays 20 (Step 225). The bypass controller 100 then sends a signal to the controller 40 to begin normal operation of the conveyor oven 1, as discussed in process 70 (Step 230).

Figure 8:
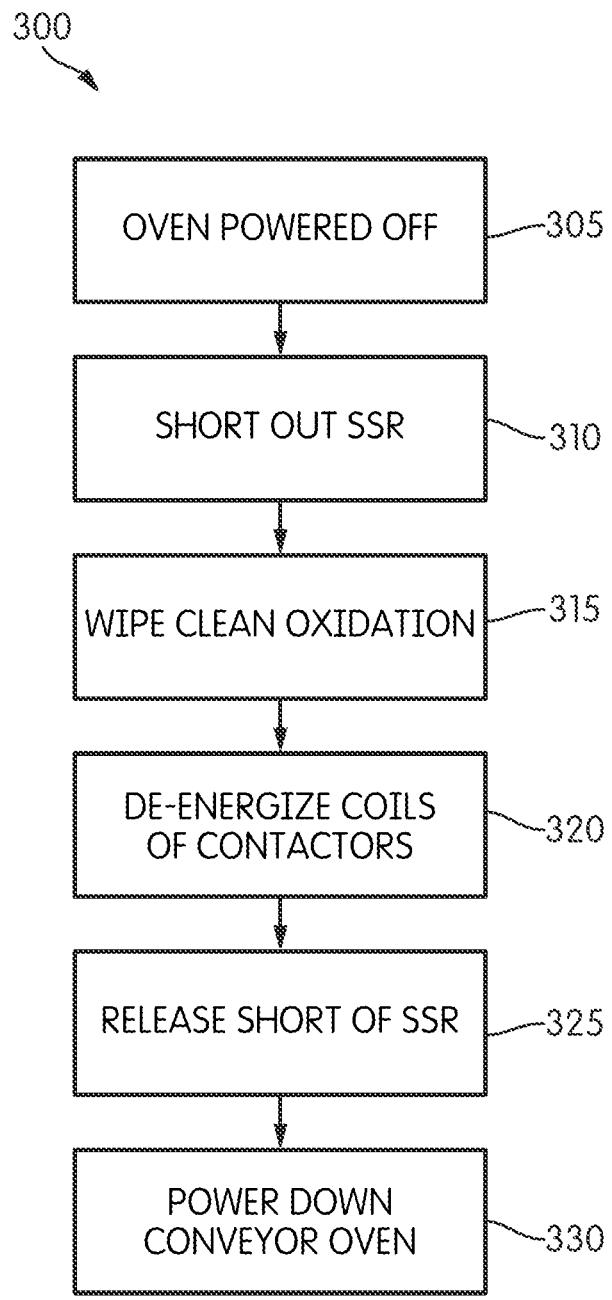
FIG. 8 is a flow diagram of a process for controlling power to a plurality of heating elements.

FIG. 8 illustrates a process 300 for controlling the power to the heating elements 15 upon shutdown. The process 300 is performed when the conveyor oven 1 is turned off (by the user or otherwise), and a signal is sent to the bypass controller 100 (Step 305). Before powering down, the bypass controller 100 activates the solid-state shorting relays 120 to short out the solid-state relays 20 (Step 310). The heating elements 15 draw approximately ten amps of current through the contacts of the contactors 30A and 30B, creating a burning arc across the contacts (Step 315). After a predetermined period of time, the bypass controller 100 de-energizes the coils of the contactors 30A and 30B (Step 320). The bypass controller 100 then de-activates the solid-state shorting relays 120 (Step 325). The bypass controller 100 then sends a signal to the controller 40 to power down the conveyor oven 1 (Step 330).

Thus, the invention provides, among other things, a bypass circuit and wipe technique for contactors used to operate solid state relays that control heating elements of a conveyor oven. Various features and advantages of the invention are set forth in the following claims.

What is claimed is:

1. A control circuit for a cooking oven, the control circuit comprising:
   a contactor, the contactor including at least one contact and at least one coil;
   a relay in series connection with the contactor;
   a heating element controlled by the relay, the heating element in a series-type configuration with the relay and the contactor; and
   a controller configured to
      control a bypass of the relay, and
      activate the at least one coil to provide power to the heating element through the contactor.

2. The control circuit of claim 1, wherein the bypass of the relay includes shorting the relay.

3. The control circuit of claim 1, wherein the contactor and heating element are connected directly in series when the relay is bypassed.

4. The control circuit of claim 1, wherein the bypass of the relay and the power to the at least one coil creates an arc across at least one contact.

5. The control circuit of claim 1, wherein the controller is configured to control the bypass of the relay during startup of the cooking oven.

6. The control circuit of claim 1, wherein the controller is configured to control the bypass of the relay during shut down of the cooking oven.

7. The control circuit of claim 1, wherein the controller is configured to control the bypass of the relay upon activation of a user bypass switch.

8. A cooking oven comprising:
   a housing;
   a heating element; and
   a control circuit, including
      a contactor, the contactor including at least one contact and at least one coil;
      a relay in a series-type configuration with the contactor and the heating element, the heating element controlled by the relay; and
      a controller configured to
         control a bypass of the relay, and
         activate the at least one coil to provide power to the heating element through the contactor.

9. The cooking oven of claim 8, wherein controlling a bypass of the relay includes shorting the relay.

10. The cooking oven of claim 8, wherein the contactor and heating element are connected directly in series when the relay is bypassed.

11. The cooking oven of claim 8, wherein controlling a bypass of the relay and power to the at least one coil creates an arc across the at least one contact.

12. The cooking oven of claim 8, wherein the controller is configured to control the bypass of the relay during the startup of the cooking oven.

13. The cooking oven of claim 8, wherein the controller is configured to control the bypass of the relay during shut down of the cooking oven.

14. The cooking oven of claim 8, further including a user bypass switch, wherein the controller is configured to control the bypass of the relay upon activation of the user bypass switch.

15. A method for controlling a cooking oven, the cooking oven including a housing and a heating element, the method comprising:
   placing in a series-type configuration,
      a relay,
      a contactor including at least one contact and at least one coil, and
      the heating element;
   controlling a bypass of the relay; and
   activating the at least one coil to provide power to the heating element through the contactor;
   wherein the heating element is controlled by the relay.

16. The method of claim 15, wherein controlling the bypass of the relay comprises shorting the relay.

17. The method of claim 15, wherein the contactor and heating element are connected directly in series when the relay is bypassed.

18. The method of claim 15, wherein controlling the bypass of the relay and controlling the power to the at least one coil creates an arc across at least one contact.

19. The method of claim 15, further including controlling the bypass of the relay during startup of the cooking oven.

20. The method of claim 15, further including controlling the bypass of the relay during shut down of the cooking oven.

21. The method of claim 15, further including controlling bypass of the relay upon activation of a user bypass switch.

22. A method of controlling a cooking oven having at least one heating element and at least one contactor, the at least one contactor having an associated coil, the method comprising:

- receiving, at a controller, a signal from a user power switch;
- generating, with the controller, a signal to activate one or more first relays;
- shorting one or more second relays subsequent to activating the one or more first relays;
- connecting the at least one contactor directly in series with the at least one heating element;
- energizing the coil of the at least one contactor to provide power to the at least one heating element through the contactor; and
- de-activating the one or more first relays.

* * * * *